(12) United States Patent
Frommann (10) Patent No.: US 7,160,443 B2
(45) Date of Patent: Jan. 9, 2007

(54) APPARATUS FOR REMOVING MATERIAL FROM A LIQUID FLOWING THROUGH A CHANNEL

(75) Inventor: Christian Frommann, Neumarkl (DE)

(73) Assignee: Hans Huber AG Maschinen- und Anlagenbau (DE)

( * ) Notice: Subject to any disclaimer, the term of this patent is extended or adjusted under 35 U.S.C. 154(b) by 0 days.

(21) Appl. No.: 11/185,336

(22) Filed: Jul. 20, 2005

(65) Prior Publication Data

US 2005/0247610 A1    Nov. 10, 2005

Related U.S. Application Data

(63) Continuation of application No. PCT/EP04/00387, filed on Jan. 20, 2004.

(51) Int. Cl.
*E03F 5/14* (2006.01)

(52) U.S. Cl. ............ 210/158; 210/159; 210/161; 210/394; 210/403

(58) Field of Classification Search ............ 210/157, 210/158, 159, 161, 391, 394, 402, 403
See application file for complete search history.

(56) References Cited

U.S. PATENT DOCUMENTS

| | | | | |
|---|---|---|---|---|
| 2,929,504 | A * | 3/1960 | Lind et al. ............ | 210/158 |
| 4,298,473 | A * | 11/1981 | Wyman ............ | 210/403 |
| 4,634,524 | A | 1/1987 | Huber ............ | 210/158 |
| 4,724,077 | A * | 2/1988 | Uchiyama ............ | 210/394 |
| 4,812,231 | A * | 3/1989 | Wiesemann ............ | 210/159 |
| 4,836,919 | A | 6/1989 | Huber ............ | 210/158 |
| 4,929,350 | A * | 5/1990 | Wade et al. ............ | 210/161 |
| 5,110,461 | A * | 5/1992 | Abel ............ | 210/158 |
| 5,552,044 | A * | 9/1996 | Abel ............ | 210/161 |
| 5,593,597 | A * | 1/1997 | Bischof ............ | 210/158 |
| 5,628,912 | A * | 5/1997 | Nesseth ............ | 210/403 |
| 5,641,398 | A * | 6/1997 | Huber et al. ............ | 210/161 |
| 6,096,201 | A * | 8/2000 | Bruke ............ | 210/159 |

(Continued)

FOREIGN PATENT DOCUMENTS

DE    3420157 C1    1/1986

(Continued)

*Primary Examiner*—Christopher Upton
(74) *Attorney, Agent, or Firm*—Thomas, Kayden, Horstemeyer & Risley, LLP (57) ABSTRACT

An apparatus for removing material from a liquid flowing through a channel includes a sieve grate, a screw conveyor and a detaching device. The sieve grate has an inflow side, an inner side and an outer side. The sieve grate is designed to be cylindrical and to be rotatably driven. The sieve grate is arranged at an inclined orientation to be partially submerged in the liquid. The sieve grate at the inflow side includes an open face. The sieve grate at the inner side includes a plurality of guide plates. The sieve grate includes a shaping carrier element. The sieve grate includes a mesh fabric, the mesh fabric being designed and arranged to form a separation surface for the material. The screw conveyor includes a housing. The screw conveyor includes a driven conveying screw. The screw conveyor is coaxially arranged with respect to the sieve grate. The screw conveyor in the region of the sieve grate includes a feeding hopper for the material, the feeding hopper having a bottom side and including a majority of openings located in the region of the bottom side. The detaching device is arranged at the outer side of the sieve grate and above the feeding hopper in a stationary way. The detaching device is designed and arranged to detach material which adheres to the separation surface from inside of the sieve grate.

14 Claims, 6 Drawing Sheets

U.S. PATENT DOCUMENTS 6,596,166 B1 * 7/2003 Danielsson et al. ......... 210/391

FOREIGN PATENT DOCUMENTS

| | | | |
|---|---|---|---|
| DE | 3630755 | C2 | 9/1986 |
| DE | 4314673 | C1 | 5/1994 |
| DE | 4443091 | C1 | 1/1996 |

* cited by examiner

APPARATUS FOR REMOVING MATERIAL FROM A LIQUID FLOWING THROUGH A CHANNEL

CROSS REFERENCE TO RELATED APPLICATIONS

This application is a continuation of International Application PCT/EP2004/00387 with an international filing date of Jan. 20, 2004 claiming priority to co-pending German Patent Application No. DE 103 02 494.8 entitled "Vorrichtung zum Entfernen von Siebgut aus in einem Gerinne strömender Flössigkeit", filed on Jan. 23, 2003.

FIELD OF THE INVENTION

The present invention generally relates an apparatus for removing material from a liquid flowing through a channel.

More particularly, the present invention relates to an apparatus for cleaning waste water including a rotatably driven sieve grate, a screw conveyor and a detaching device. With such an apparatus, especially screenings or rakings are removed from a liquid flowing in a channel.

BACKGROUND OF THE INVENTION

An apparatus device for removing material from a liquid flowing through a channel is known from German Patent No. DE 34 20 157 C1 corresponding to U.S. Pat. No. 4,634,524. The known apparatus includes a cylindrical sieve grate which is partially submerged in the liquid with its axis in inclined manner, the grate having a hydraulically open front side on the inflow side thereof and a hydraulically substantially closed back side on the outflow side thereof. The sieve grate includes a perforation of slits forming a separation surface on the inner side, while the liquid penetrates the slits and remains in the channel. The cylindrical sieve grate is rotatably driven in connection with a screw conveyor. The screw conveyor has a feeding hopper being coaxially arranged in bearings with respect to the sieve grate. The screw conveyor includes a housing and a conveying screw. A fixed detaching device in form of a brush roll or a spray rail for water for detaching the material to be raked and/or screened adhering to the separation surface inside the sieve grate is provided on the outer side of the sieve grate, above the feeding hopper. The rakings fall in the feeding hopper being the first element of the screw conveyor, and they are upwardly conveyed to the discharge point outside of and above the liquid. The cylindrical sieve grate includes spiral guide plates arranged on the inner side of the grate having the function to convey upwardly especially larger rakings and to hinder them from falling back during rotation of the sieve grate. The openings of the perforation of the sieve grate may be designed to have a size of between several millimeters to about 10 mm. Smaller openings cannot be produced economically. Consequently, the known apparatus cannot be used to treat sludge-like screenings.

An apparatus for removing material to be raked and/or to be screened from a liquid flowing in a channel is known from German Patent No. DE 36 30 755 C2 corresponding to U.S. Pat. No. 4,836,919. The known apparatus includes a driven cylindrical sieve grate being positioned in inclined manner in the channel. A screw conveyor leads from a feeding hopper being arranged near the sieve grate to a discharge point outside the channel. The sieve grate includes a number of ring-like discs being arranged side by side with distance to each other in order to form slits. A stripper bar forming a detaching device is positioned inside the sieve grate above the feeding hopper. The feeding hopper includes a wall upwardly extending to the stripper bar. The stripper bar may be positioned on the outside of the sieve grate also extending inwardly through the slits between the ring-like discs. There are constructive limits in the design due to the formation of the openings of the sieve grate in form of the number of ring-like discs. Consequently, the known apparatus can be used to remove rakings rather than screenings. Sludge cannot be screened using the known apparatus.

SUMMARY OF THE INVENTION

The present invention relates an apparatus for removing material from a liquid flowing through a channel. The apparatus includes a sieve grate, a screw conveyor and a detaching device. The sieve grate has an inflow side, an inner side and an outer side. The sieve grate is designed to be cylindrical and to be rotatably driven. The sieve grate is arranged at an inclined orientation to be partially submerged in the liquid. The sieve grate at the inflow side includes an open face. The sieve grate at the inner side includes a plurality of guide plates. The sieve grate includes a shaping carrier element. The sieve grate includes a mesh fabric, the mesh fabric being designed and arranged to form a separation surface for the material. The screw conveyor includes a housing. The screw conveyor includes a driven conveying screw. The screw conveyor is coaxially arranged with respect to the sieve grate. The screw conveyor in the region of the sieve grate includes a feeding hopper for the material, the feeding hopper having a bottom side and including a majority of openings located in the region of the bottom side. The detaching device is arranged at the outer side of the sieve grate and above the feeding hopper in a stationary way. The detaching device is designed and arranged to detach material which adheres to the separation surface from inside of the sieve grate.

The present invention also relates to an apparatus for removing polluted material from waste water. The apparatus includes a sieve grate including a carrier element and a mesh fabric. The carrier element is designed to be cylindrical and to be dimensionally stable. The carrier element has an inner surface and a plurality of openings. The mesh fabric is fixedly connected to the inner surface of the carrier element. The mesh fabric is designed to be flexible. The mesh fabric has a majority of openings being designed to be substantially smaller than the openings of the carrier element. The mesh fabric is designed and arranged to form a separation surface at which polluted material can be separated from the water in a way that the polluted material cannot pass through the openings of the mesh fabric whereas the water can pass through the openings of the mesh fabric.

The novel apparatus is capable of screening sludge to be removed from a liquid flowing in a channel. Fabrics and other screenings of small dimension can also be removed by the novel apparatus.

The present invention deviates from prior art sieve grates made of a cylindrically bent sheet metal having openings in the shape of slits or holes or made of ring-like discs being arranged side by side in a spaced apart manner.

The novel sieve grate is designed to include at least two elements, one of them being a mesh fabric forming the separation surface on its inner side to deposit the sludge-like screenings. Such a mesh fabric is a very economical possibility of realizing the openings of the separation surface to have a different size compared to the possibilities given by forming slits between ring-like discs or to arrange holes or bores in sheet metal. Each mesh of a mesh fabric has an approximately constant cross section area. A mesh fabric can be easily produced such that the openings have the desired size appropriate for removing sludge-like screenings. The openings may be designed to be very small and uniform. It is possible to use sizes of only a fraction of a millimeter.

Such a mesh fabric is somewhat instable, meaning it has difficulties maintaining a constant diameter of the sieve grate. For this reason, the mesh fabric is assisted and supported by a shaping carrier element ensuring that the cylindrical shape of the sieve grate is permanently maintained. The shaping carrier element has larger openings than the mesh fabric to allow for passage of the liquid therethrough.

A stationary detaching device for detaching the material to be screened which adheres to the separation surface inside of the sieve grate is arranged outside of the circumference of the sieve grate and outside of the liquid level in the channel. The detaching device preferably includes a spray rail to remove the material to be screened which adheres to the separation surface inside of the sieve grate and to be upwardly conveyed during rotation of the sieve grate and to be dumped into the feeding hopper. Thus, spray water also enters the feeding hopper. Liquid from the channel is also upwardly conveyed when conveying the screenings. The liquid also enters the feeding hopper. The screenings deposited with the mesh fabric on the separation surface agglomerate by the use of a spray rail serving as the detaching device, and they enter the feeding hopper. The feeding hopper includes openings being arranged in its bottom part and serving to achieve a pre-dewatering effect in the feeding hopper. The liquid coming from the pressing zone of the screw conveyor is conveyed back into the channel through these openings.

The separation surface is coordinated with guide plates. The guide plates are designed as containers, tubs or troughs serving to convey the mixture of screenings and liquid in an upward direction. The guide plates are divided by separation walls arranged along the length of the plates to form separate conveying containers. A wall may be arranged at the end of the guide plates. Consequently, portions of the mixture of liquid and screenings are upwardly conveyed. Liquid flows out off the containers resulting in an increase of concentration of screenings in the containers.

In an especially simple embodiment, the guide plates being arranged in sealed manner with respect to the separation surface are no longer arranged in a spiral configuration, but rather to be parallel to the axis of the sieve grate and with respect to the inner circumference of the separation surface. The guide plates include shovel-like containers conveying the screenings upwardly during rotation of the sieve grate. The containers of a guide plate one after the other emerge the liquid level in the channel due to the inclined arrangement of the axis of the apparatus. The liquid emerges the mesh fabric below and above the liquid level in the channel resulting in an increase of the concentrating of the screenings in the containers. Further increase of the concentration of the screenings takes place when upwardly conveying due to the change of the liquid level of the mixture of liquid and screenings in the containers and due to the decrease of volume provided by the containers. This increased concentration of the material to be screened is desired to treat such sludge material.

However, it is also possible to not to arrange the guide plates to be parallel to the axis of the sieve grate, but instead to be parallel to the liquid level in the channel with respect to the separation surface. In this way, separation walls are not required. However, there are end walls, and the angle of arrangement of the apparatus in the channel is constant. If it is desired that the angle of arrangement of the apparatus in the channel is variable, separation walls are arranged to form single trough-like chambers on the guide plates.

The conveying screw of the screw conveyor may include brushes located in the region of the sieve grate, the brushes stroking the pierced feeding hopper. The brushes are positioned on the outer circumference of the conveying screw, and they have the function to clean the openings arranged in the bottom part of the feeding hopper over and over again during operation of the apparatus to achieve a constant pre-dewatering effect of the deposited screenings.

The apparatus also may be operated discontinuously to reach a certain deposition of material on the separation surface of the mesh fabric during standstill periods of the sieve grate. In this way, a certain damming effect of the liquid occurs in the channel, and a greater part of the separation surface of the sieve grate is used even though the sieve grate with its axis is arranged in inclined manner in the channel. A part of the bottom of the feeding hopper being perforated is arranged below the liquid level in the channel. This perforated bottom is also used for depositing purposes. During time periods when the sieve grate is driven to rotate, a cleaning action of the perforated bottom of the feeding hopper takes place, again. Damming of the liquid in the channel is decreased.

The guide plates may be designed to be open on the side not facing the mesh fabric with respect to the separation surface. The openings may be designed to be comb-like or to be composed of bores, slits and the like. Especially, liquid penetrates trough these openings when the guide plates are upwardly moved during rotation of the sieve grate prior to reaching the detaching device. An increase of concentration of the deposited sludge-like screenings occurs due to this design.

The shaping carrier element may be designed in different ways. It may be designed as a supporting fabric having comparatively large meshes and maintaining the shape after bending operation and causing the mesh fabric to maintain its shape. The mesh fabric can be fixedly connected to the supporting fabric in areas or only by point-like connections. However, it is also possible to use a basket having arms and struts as the shaping carrier element, the basket being designed to receive the mesh fabric along its inner circumferential surface.

The detaching device preferably includes nozzles to spray water and/or compressed air. One or more spray rails may be arranged parallel to the surface line of the cylindrical sieve grate. The nozzles have the function to ensure that the shaping carrier element is penetrated by the spray water and/or the compressed air resulting in loosening of the deposited screenings from the separation surface and deposit in the feeding hopper.

The feeding hopper in axial direction may-be designed to be offset or longer than the axial extension of the sieve grate as to the inclined arrangement of the axis of the device. In this way, the feeding hopper extends through the open front side of the sieve grate to a certain amount. However, it is possible also to position an upwardly extending end wall on the feeding hopper to avoid the axial offset. The side walls of the feeding hopper may also be arranged to extend upwardly even up to the inner surface of the sieve grate due to the fact that the detaching device is positioned outside of the sieve grate.

The mesh fabric may be especially a square meshes fabric having a mesh aperture between approximately 0.2 mm and 1.2 mm. Such square mesh fabrics may be manufactured economically on looms. The mesh aperture may be kept constant in narrow regions, and it allows for an individual adaptation with respect to the size of the particles of the sludge-like screenings. Consequently, screenings in form of fibers, hairs and the like can be removed without difficulty.

The feeding hopper perforated at its bottom may include bores with a diameter of approximately 2 mm. Bores of this size do not prevent screening of sludge-like material. The screenings deposited with the fine mesh fabric will agglomerate during detaching, and they enter the feeding hopper. Bores of this size are very effective to reach an improved pre-dewatering effect in the feeding hopper.

The number of the guide plates forming the containers over the separation surface may be chosen. Adaptation with respect to the consistence of the sludge is individually possible. In many cases, it is sufficient to arrange three guide plates over the separation surface. The guide plates are arranged to be equally spaced apart.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
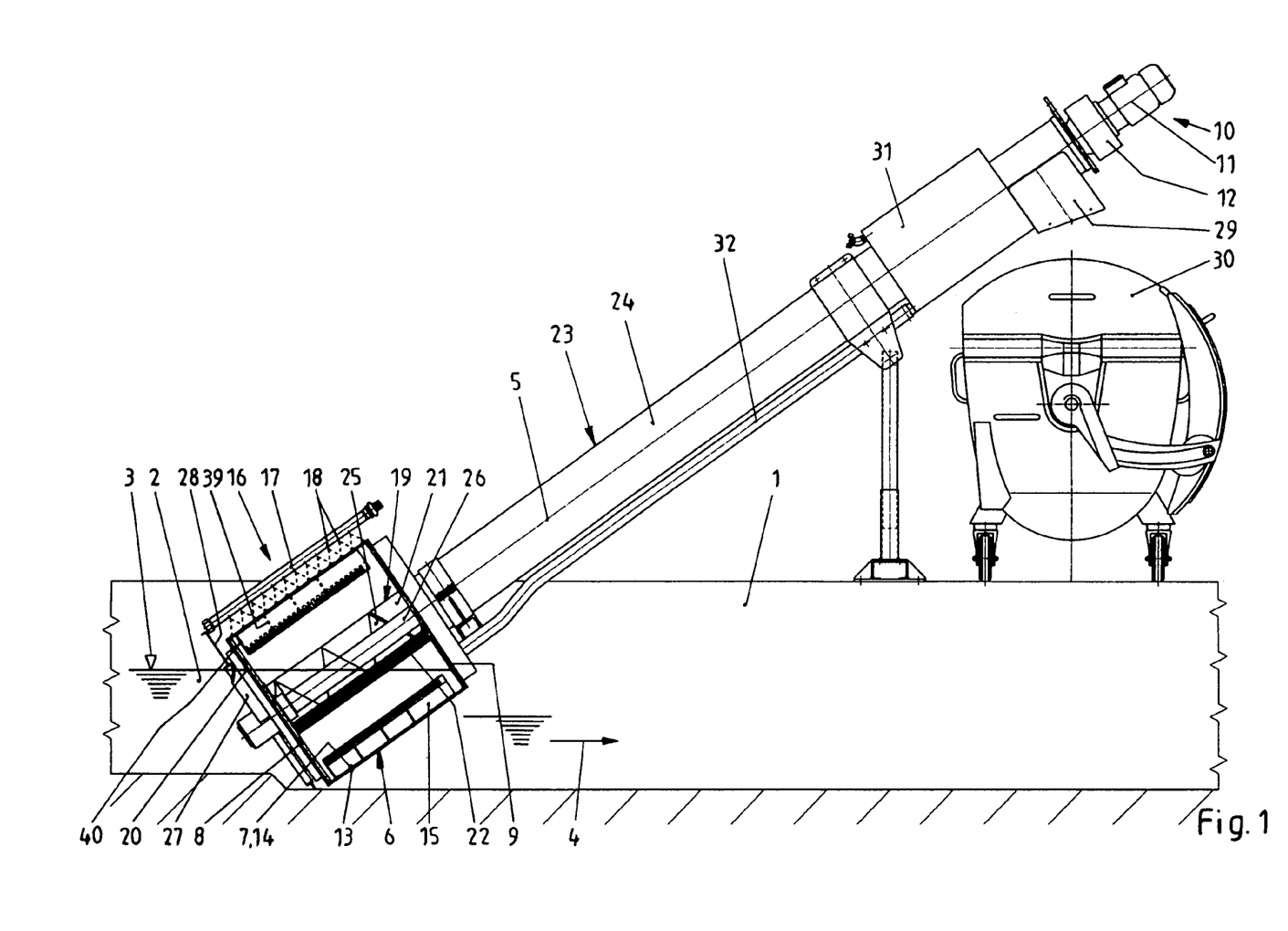
FIG. 1 is a schematic side view of the novel apparatus arranged in a channel.

Referring now in greater detail to the drawings, FIG. 1 shows a part of a channel 1 in which a liquid 2 contaminated with material to be screened and having a water level 3 is flowing in the direction of arrow 4.

The novel apparatus for removing material from the liquid 2 flowing through the channel 1 is located in the channel 1 such that its axis 5 is arranged in a inclined manner. Preferably, the angle of inclination is approximately 35°. However, other angles of inclination are also possible. The apparatus includes a cylindrical sieve grate 6 including a mesh fabric 7. The sieve grate 6 has an open front side 8 on the inflow side thereof, the contaminated liquid 2 flowing through the open front side 8 into the interior of the sieve grate 6. A sealed and thus hydraulically closed back side 9 is located downstream. The sieve grate 6 is rotatably arranged near the back side 9, and it is sealed with respect to elements not rotating. The sieve grate 6 is rotatably driven about its axis 5. The drive is designed to be especially discontinuous, meaning that time periods of rotation and time periods of standstill are following each other. A motor 11 serves for the drive 10 possibly including a gear 12.

The sieve grate 6 includes a shaping carrier element 13. The mesh fabric 7 is located at the inner surface of the carrier element 13. It is a function of the carrier element 13 to permanently guarantee the cylindrical shape of the sieve grate 6 and to accept forces. The inner cylindrical surface of the mesh fabric 7 forms a separation surface 14. Guide plates 15 are located arranged to be parallel to the axis 5 of the apparatus and to a surface line of the cylindrical sieve grate 6, respectively. The guide plates 15 are in sealing contact to the separation surface 14, and they are separated by separation walls 39 and at least closed at one end by an end wall 40. The containers designed in this manner rotate with the sieve grate 6 and thus form trough-like chambers moving from below the water level 3 in an upward direction out off the water level 3 while rotating and conveying the material to be screened.

A detaching device 16 is arranged above the water level 3 and above the sieve grate 6, the detaching device including a spray rail 17 having nozzles 18. Water is sprayed with the detaching device 16 from outside through the openings of the carrier element 13 and the openings in the mesh fabric 7 such that the material to be deposited on the inner surface of the mesh fabric 7 is detached and reaches a feeding hopper 19 under the influence of gravity and/or the forces of the sprayed water. The feeding hopper 19 is arranged in stationary manner and to be parallel to the axis 5 of the apparatus. Preferably, it is arranged concentrically with respect to the sieve grate 6. The detaching device 16 may be designed to operate with spray water and/or pressurized air. The feeding hopper 19 includes an upwardly extending hopper wall 20 and side walls 21, both being arranged with respect to the open front side 8 of the sieve grate 6. The feeding hopper 19 includes openings 22 on the bottom side, possibly having a diameter of up to approximately 2 mm.

A screw conveyor 23 is located coaxially to the axis 5 of the apparatus and thus also to the sieve grate 6, the screw conveyor 23 including a housing 24 and a conveying screw 25 positioned therein. A shaft 26 running through and carrying the conveying screw 25 extends from the motor 11 and the gear, respectively, through the entire housing 24 and projects in an axial direction with respect to the housing 24. The conveying screw 25 cooperates with the feeding hopper 19 in this region. In this region, the conveying screw 25 may include brushes (not illustrated for clarity reason), the brushes stroking the bottom wall of the feeding hopper 19 and thus cleaning and uncovering the openings 22 over and over again.

The motor 11 drives the conveying screw 25 of the screwing conveyor 23 via the shaft 26. The motor 11 also serves to rotate the sieve grate 6. A drive arm 27 may serve for fulfilling this function, the drive arm being fixedly connected to the shaft 26 and the sieve grate 6, especially with its carrier element 13. The area between the sieve grate 6 and the walls of the channel 1 is sealingly closed by a planking sheet metal 28, so that the contaminated liquid 2 is forced to enter the interior of the cylindrical sieve grate 6 via the open front side 8. The liquid 2 flows through openings located in the mesh fabric 7 and remains in the channel 1 while the material to be deposited is deposited on the inner surface of the mesh fabric 7 and is conveyed upwardly by the sieve grate 6 during rotation. After being released by the detaching device 16, the material enters the feeding hopper 19 and thus reaches the screwing conveyor 23. It is upwardly conveyed and reaches a discharge point 29, for example a container 30. A pressing zone 31 may be arranged in the upper region of the screwing conveyor 23 further dewatering the material to be deposited and conveyed prior to reaching the discharge point 29. A conduit 32 leads the liquid of the pressing zone 31 back into the channel 1.

FIG. 2 again indicates the design of the sieve grate 6 at an enlarged scale. The inner circumference of the sieve grate 6 carrying the mesh fabric 7 forming the separation surface 14 is shown. It may also be seen that the guide plates 15 extend parallel to the axis 5, and they are arranged in inclined manner with respect to the separation surface 14 of the mesh fabric 7. The guide plates 15 at its free side not facing the separation surface 14 include openings 33, the openings in the exemplary illustrated case being designed in a comb-like manner. For example, the openings 33 may also have the form of bores being located in this region of the guide plates 15. Consequently, a permanent dewatering effect occurs during the upwardly directed conveying motion of the material to be screened in the through-like chambers. The levels of the liquids in the chambers vary, and liquid passes the comb-like openings 33 or the bores and flows back into the channel 1.

Figure 2:
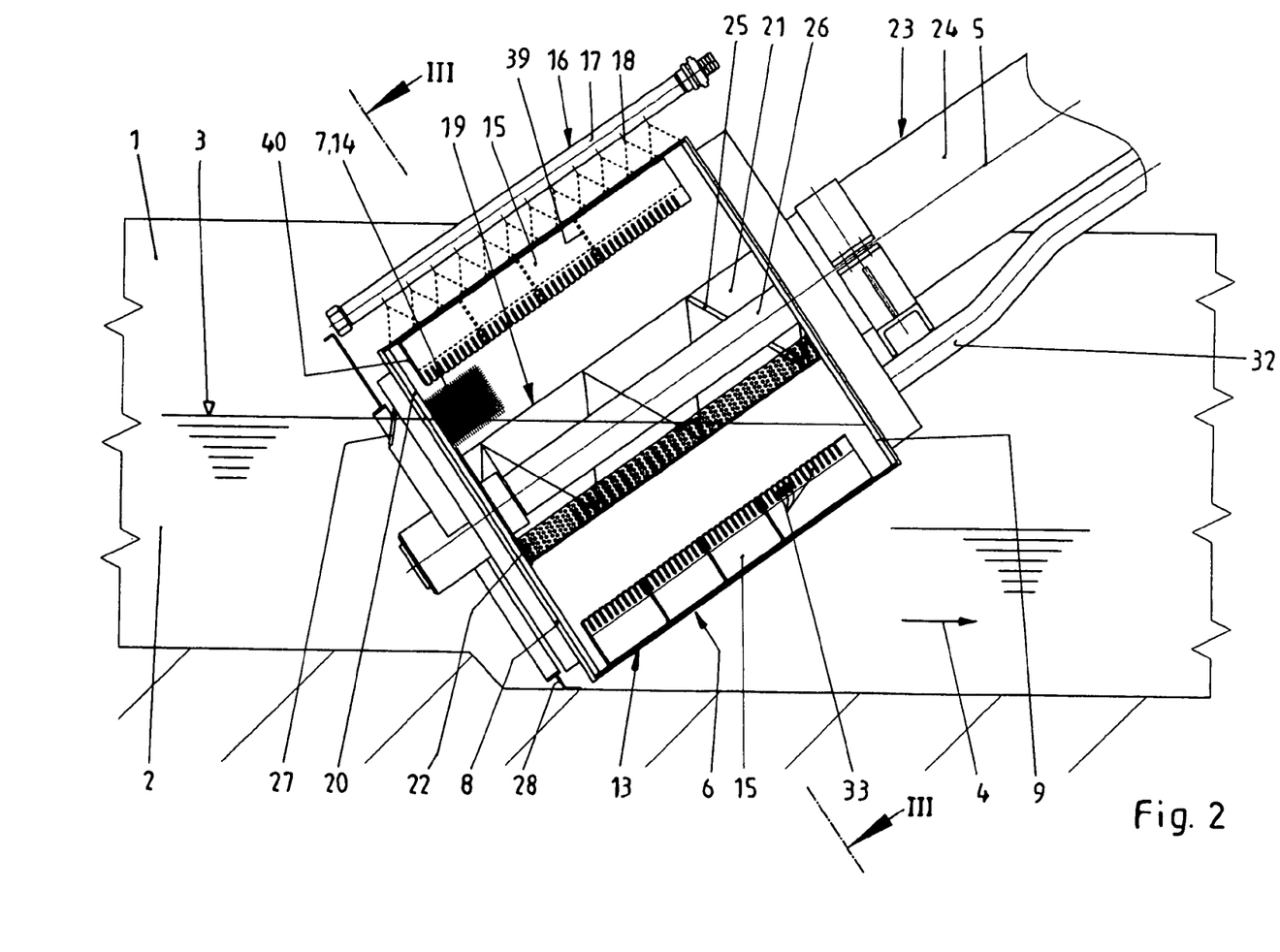
FIG. 2 is a detailed view of a part of the novel apparatus at an enlarged scale.
Figure 3:
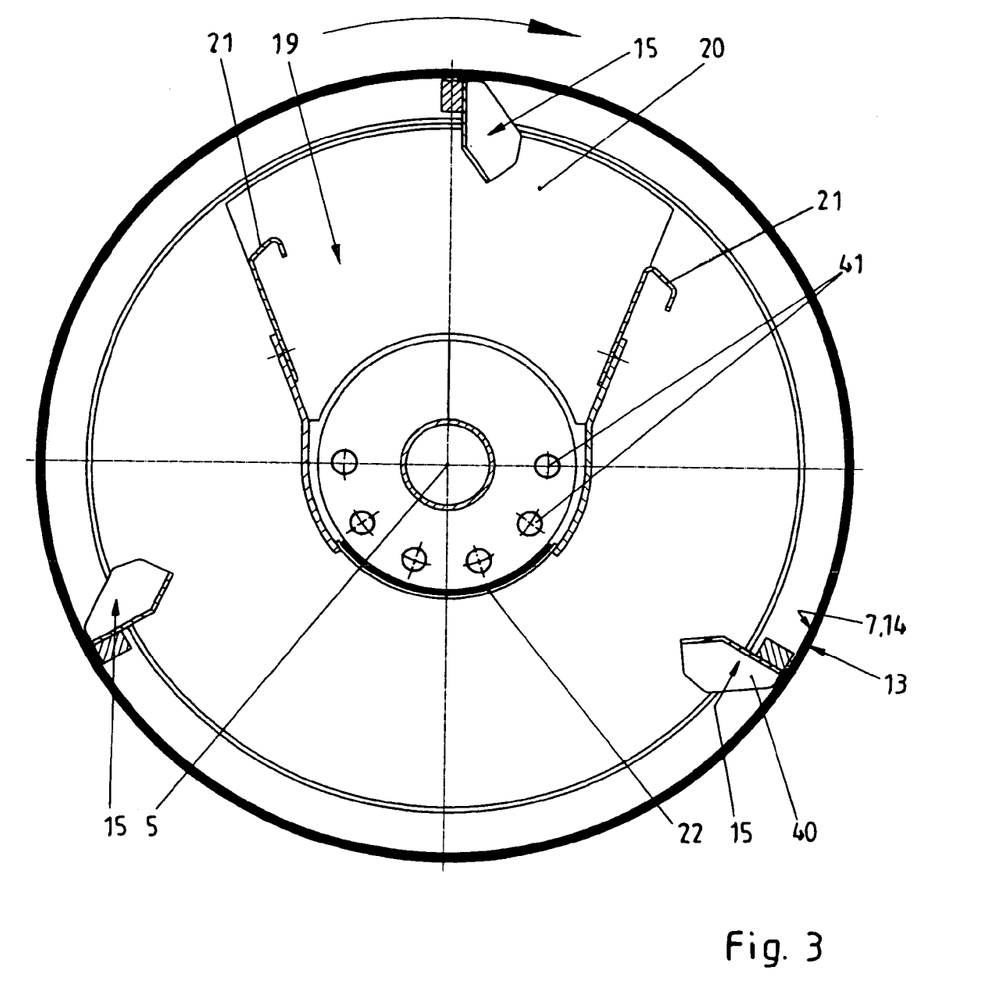
FIG. 3 is a cross sectional view along line III—III in FIG. 2.

FIG. 3 indicates the design of the novel apparatus according to line III—III in FIG. 2. The feeding hopper 19 may be easily seen. The feeding hopper 19 includes a side wall 21 which may have openings 41 arranged in the lower region being arranged in addition to the openings 22 of the bottom of the feeding hopper 19. The openings 41 may have a larger diameter than the openings 22 arranged in the region of the bottom. The arrangement of three guiding plates 15 is to be seen, the guiding plates 15 being produced as straight elements and being arranged parallel to the axis 5 of the apparatus.

Figure 4:
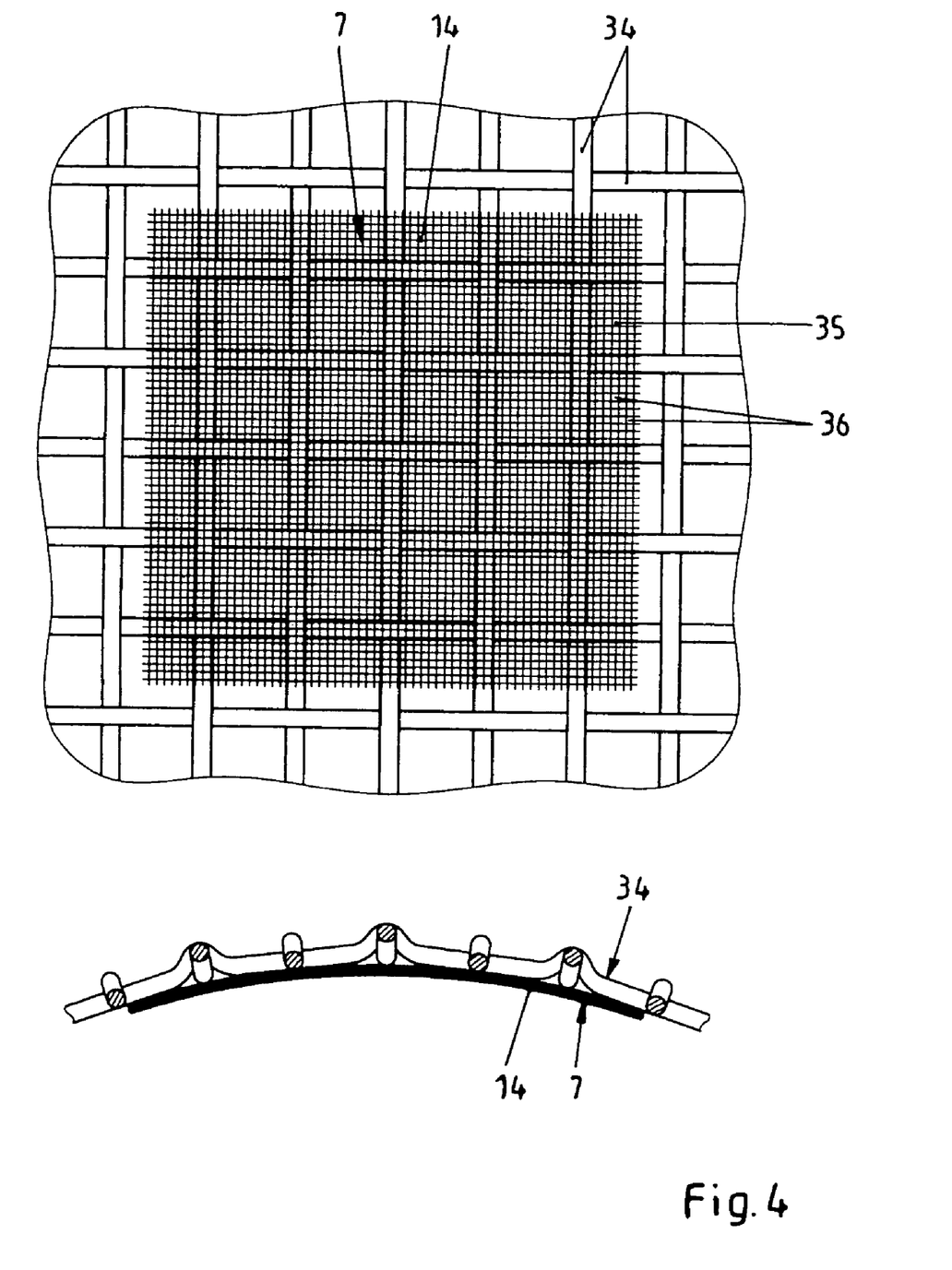
FIG. 4 is a cross sectional view and a top view at an enlarged scale of the sieve grate including of a mesh fabric and a supporting fabric.

FIG. 4 indicates the mesh fabric 7 and the carrier element 13 at an enlarged scale. In this case, the carrier element 13 has the function of a supporting fabric 34. The supporting fabric 34 ensures the shape, and it is designed to be comparatively rigid so that it maintains its shape and provides stability to the sieve grate 6 when being cylindrically bent. The mesh fabric 37 is a square meshes fabric 35 having a mesh aperture size 36 of approximately between 0.2 mm and 1.2 mm depending on the application. The interior of the square mesh fabric 35 fulfils the function of the separating surface 14.

Figure 5:
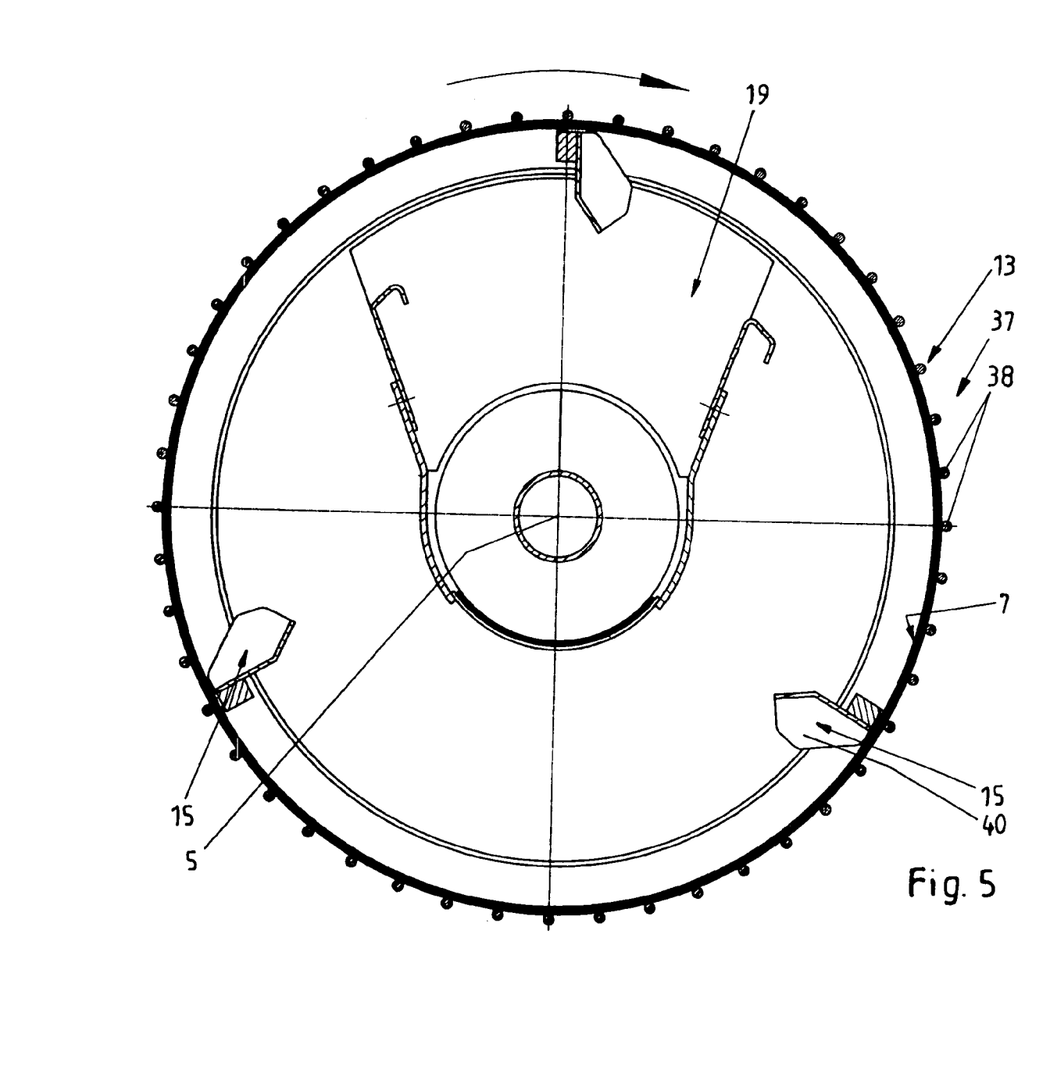
FIG. 5 is a view similar to FIG. 3 but illustrating a shaping carrier element designed as a basket having arms.
Figure 6:
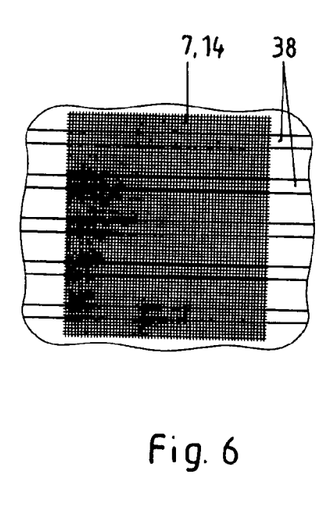
FIG. 6 is a top view of the sieve grate of FIG. 5.

Another exemplary embodiment of the sieve grate 6 is illustrated in FIGS. 5 and 6. A basket 37 having arms fulfills the function of the shaping carrier element 13. The struts 38 of the basket 37 are arranged to be parallel to the axis 5. The struts 38 are supported by circular extending supporting elements (not shown). The inner circumference of the basket 37 or the carrier element 13 is coated with the mesh fabric 7. The region of the bottom of the feeding hopper 19 may be designed as a perforated plate having the openings 22. In addition, the openings 41 shown in FIG. 3 may be arranged in the hopper wall 20.

Figure 7:
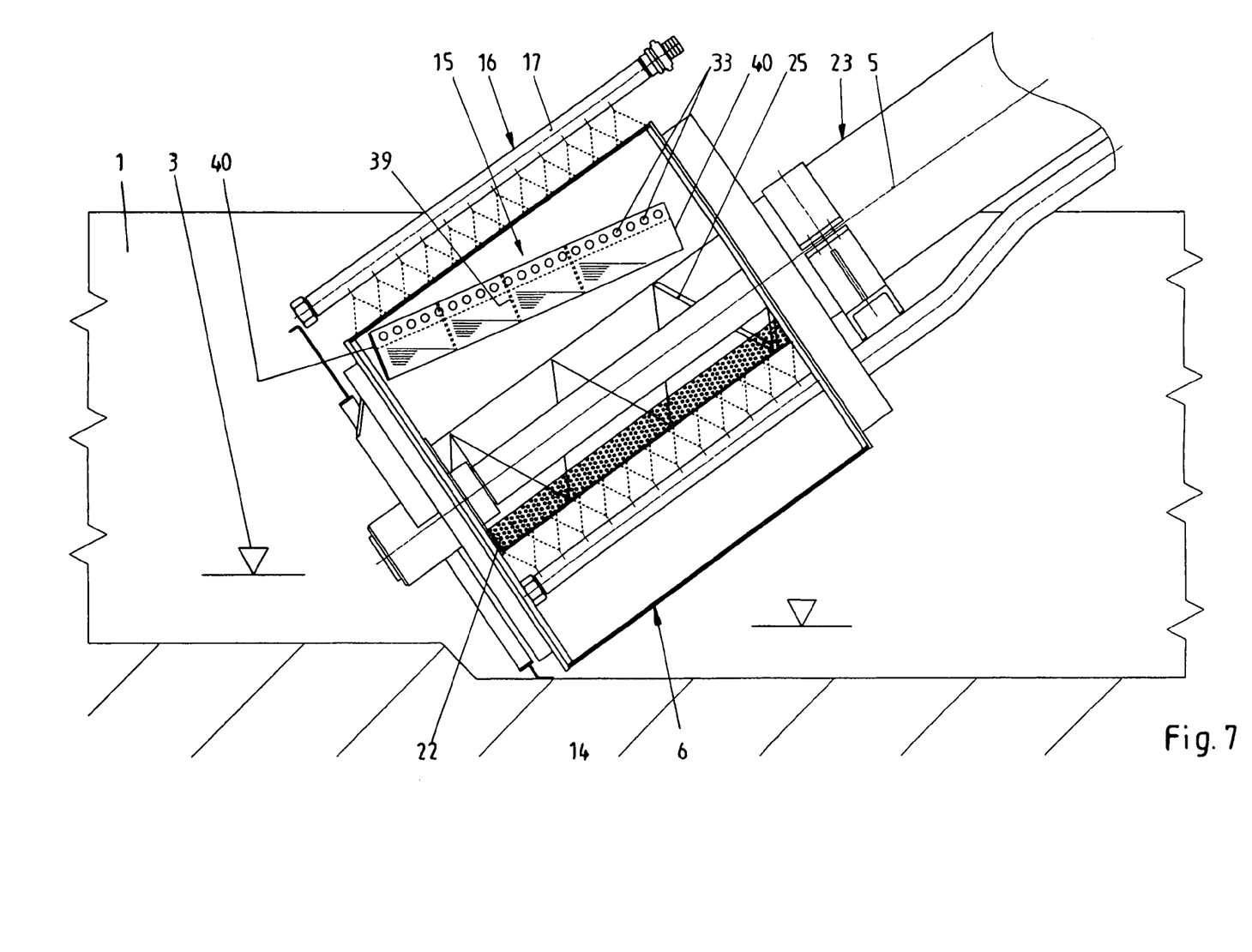
FIG. 7 is a view of another embodiment of the novel apparatus.

FIG. 7 shows another exemplary embodiment of the apparatus having many features in common with the one illustrated in FIG. 2. The guide plates 15 are designed as bent elements arranged in inclined manner with respect to the horizontal direction and thus not parallel to the interior circumference of the sieve grate 6 in sealed relation. Bores 42 may be arranged near the rim instead of using a comb-like shape of the guide plates 15. A plurality of guide plates 15 may be arranged in a way to be evenly distributed about the circumference. However, only one guide plate 15 is shown for reasons of clarity. The level of the liquid of each single container-like chamber will vary during rotation of the sieve grate 6. Dewatering takes place in this manner, and liquid permanently flows back into the channel 1.

One or more additional spray rails 43 are shown in FIG. 7, the spray rails being positioned below the perforated plate having the openings 22. These spray rails 43 also include nozzles 44, and they may be operated with spraying water and/or pressurized air. The spray rails 43 may be used in addition or alternatively to the brushes being positioned at the inside of the rim of the conveying screw 15 in the region of the feeding hopper 19. The spray rails 43 serve to assist cleaning of the openings 22 of the perforated plate of the feeding hopper 19. Preferably, the spray rails 43 and the entire apparatus may be operated discontinuously. Preferably, they are operated during the time periods when the water level 3 in the channel 1 has fallen below a lower level (as illustrated) after cleaning of the sieve grate 6.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for removing material from a liquid flowing through a channel, comprising:

a sieve grate having an inflow side, an inner side and an outer side, said sieve grate being designed to be cylindrical and to be rotatably driven, said sieve grate being arranged at an inclined orientation to be partially submerged in the liquid, said sieve grate at the inflow side including an open face, said sieve grate at the inner side including a plurality of guide plates, said guide plates being containers designed and arranged to convey a mixture of material and liquid in an upward direction during rotation of said sieve grate, said sieve grate including a shaping carrier element, said sieve grate including a mesh fabric, said mesh fabric being designed and arranged to form a separation surface for the material;

a screw conveyor, said screw conveyor including a housing, said screw conveyor including a driven conveying screw, said screw conveyor being coaxially arranged with respect to said sieve grate, said screw conveyor in the region of said sieve grate including a feeding hopper for the material, said feeding hopper having a bottom side and including a plurality of openings located in the region of the bottom side; and a detaching device, said detaching device being arranged at the outer side of said sieve grate and above said feeding hopper in a stationary way, said detaching device being designed and arranged to detach material which adheres to the separation surface from inside of said sieve grate.

2. The apparatus of claim 1, wherein said guide plates are designed and arranged to contact said mesh fabric.

3. The apparatus of claim 2, wherein said screw conveyor has an axis of symmetry, said guide plates being arranged to be parallel to the axis of symmetry.

4. The apparatus of claim 1, wherein said conveying screw in the region of said sieve grate includes a plurality of brushes, said brushes being designed and arranged to contact said feeding hopper.

5. The apparatus of claim 1, wherein said guide plates at a side facing away from said mesh fabric include a plurality of openings.

6. The apparatus of claim 5, wherein said openings are designed similar to openings of a comb.

7. The apparatus of claim 1, wherein said shaping carrier element is designed as a supporting fabric.

8. The apparatus of claim 1, wherein said shaping carrier element is designed as a basket including arms.

9. The apparatus of claim 1, wherein said detaching device includes a plurality of nozzles, said nozzles being designed and arranged to spray water.

10. The apparatus of claim 1, wherein said detaching device includes a plurality of nozzles, said nozzles being designed and arranged to spray water and compressed air.

11. The apparatus of claim 1, wherein said feeding hopper includes a wall, said wall being arranged in the region of said open face of said sieve grate in a way to extend in an upward direction.

12. The apparatus of claim 1, wherein said mesh fabric is designed as a square mesh fabric including mesh apertures of between approximately 0.2 mm and 1.2 mm.

13. The apparatus of claim 1, wherein said feeding hopper includes openings of a diameter of approximately 2 mm.

14. The apparatus of claim 1, wherein said sieve grate includes three guide plates being arranged in a spaced apart manner with respect to the separation surface.

* * * * *